(12) United States Patent
Bartz et al.

(10) Patent No.: US 7,610,316 B2
(45) Date of Patent: Oct. 27, 2009

(54) EXTENSIBLE ARCHITECTURE FOR VERSIONING APIS

(75) Inventors: Bradley J. Bartz, Lynnwood, WA (US); Michael R. Santoro, Wallingford, WA (US); Christopher G. Kaler, Redmond, WA (US); Zachary L. Anderson, Redmond, WA (US); Christopher D. Reeves, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 10/935,350

(22) Filed: Sep. 7, 2004

(65) Prior Publication Data
US 2005/0034137 A1   Feb. 10, 2005

Related U.S. Application Data

(63) Continuation of application No. 09/717,533, filed on Nov. 21, 2000, now Pat. No. 6,842,904.

(51) Int. Cl.
G06F 12/00 (2006.01)
G06F 17/00 (2006.01)
G06F 9/44 (2006.01)

(52) U.S. Cl. .................. 707/203; 707/100; 717/122; 717/170; 719/328

(58) Field of Classification Search ......... 707/100, 707/203; 719/328; 717/122, 170
See application file for complete search history.

(56) References Cited

U.S. PATENT DOCUMENTS

| | | | |
|---|---|---|---|
| 5,623,661 A * | 4/1997 | Hon .............................. 707/1 |
| 5,805,889 A * | 9/1998 | Van De Vanter ............. 717/107 |
| 5,918,232 A | 6/1999 | Pouschine et al. ........... 707/103 |
| 5,924,102 A * | 7/1999 | Perks .......................... 707/200 |
| 5,974,416 A * | 10/1999 | Anand et al. ................. 707/10 |
| 6,112,024 A * | 8/2000 | Almond et al. ............. 717/122 |
| 6,195,709 B1 * | 2/2001 | Gupner et al. .............. 719/316 |
| 6,237,003 B1 * | 5/2001 | Lewish et al. ............... 707/101 |
| 6,243,862 B1 | 6/2001 | Lebow ......................... 717/131 |
| 6,341,289 B1 | 1/2002 | Burroughs et al. ........ 707/104.1 |
| 6,385,604 B1 * | 5/2002 | Bakalash et al. ............... 707/3 |

(Continued)

OTHER PUBLICATIONS

Blakeley, José A., "Data Access For The Masses Through OLE DB", SIGMOD '96, Montreal, Canada, Jun. 1996, pp. 161-172.*

(Continued)

*Primary Examiner*—Robert Stevens
(74) *Attorney, Agent, or Firm*—Woodcock Washburn LLP

(57) ABSTRACT

Some large software development projects need more than one versioning system to accommodate not only a diversity of document formats and data types, but also the geographic diversity of its programmers. However, having more than one versioning system is generally very expensive. A major factor in this expense is the requirement for a separate application program interface (API) for each separate versioning system. Accordingly, the inventors devised an exemplary API architecture that can be extended with "plug-in" protocol providers to include virtually any number of separate version stores or versioning systems. The exemplary architecture includes a generic command parser and a command dispatcher. The command dispatcher operatively couples to one or more protocol providers, each coupled to at least one version store. Inclusion of the OLE DB-compliant interface and the command parser in the exemplary embodiment saves the protocol providers the effort and expense of replicating these features, thereby reducing the cost of adding version stores.

10 Claims, 3 Drawing Sheets

U.S. PATENT DOCUMENTS

| | | | |
|---|---|---|---|
| 6,457,003 B1 | 9/2002 | Gajda et al. | 707/4 |
| 6,460,043 B1* | 10/2002 | Tabbara et al. | 707/100 |
| 6,463,442 B1* | 10/2002 | Bent et al. | 707/103 R |
| 6,473,807 B1 | 10/2002 | Hills et al. | 709/330 |
| 6,594,651 B2 | 7/2003 | Kabra et al. | 707/2 |
| 6,643,652 B2* | 11/2003 | Helgeson et al. | 707/10 |
| 6,745,388 B1 | 6/2004 | Gupta et al. | 719/315 |
| 6,842,904 B1* | 1/2005 | Bartz et al. | 719/328 |
| 7,016,906 B1* | 3/2006 | Janzig et al. | 707/101 |
| 7,133,865 B1* | 11/2006 | Pedersen et al. | 707/3 |

OTHER PUBLICATIONS

Dumas, Sophie, et al., "A Workbench For Predicting The Performances Of Distributed Object Architectures", Simulation Conference Proceedings, Winter 1998, vol. 1, Washington, DC, Dec. 13-16, 1998, pp. 515-522.*

Ritter, David, "The Middleware Muddle", SIGMOD Record, vol. 27, No. 4, Dec. 1998, pp. 86-93.*

Blakeley, José A., et al., "Microsoft Universal Data Access Platform", SIGMOD '98, Seattle, WA, © 1998, pp. 502-503.*

White, Colin J., "The IBM Business Intelligence Software Solution", Version 4, May 2000, pp. i-iii and 1-27.*

Blakeley, José A., "Data Access for the Masses", SIGMOD '96, Montreal, Canada, Jun. 1996, pp. 161-172.*

Reinwald, Berthold, et al., "Heterogeneous Query Processing Through SQL Table Functions", Proc. of the 15th Int'l Conf. on Data Engineering, Sydney, Australia, Mar. 23-26, 1999, pp. 366-373.*

Blakeley, José A., "Universal Data Access with OLE DB", COMPCON '97, San Jose, CA, Feb. 23-26, 1997, pp. 2-7.*

Brandani, Silvio, "Multi-Database Access from AMOS II Using ODBC", Linköping Electronic Articles in Computer and Information Science, vol. 3, No. 19, ISSN 1401-9841, Linköping University Electronic Press, Linköping, Sweden, Nov. 27, 1998, pp. 1-55.*

Josifovski, Vanja, et al., "Distributed Mediation Using a Light-Weight OODBMS", ECOOP Workshop on Object-Oriented Databases, May 20, 1999, pp. 49-60.*

Lee, Sang-Won, et al., "Object Versioning in an ODMG-Compliant Object Database System", Software: Practice and Experience, vol. 29, Issue 5, Apr. 1, 1999, pp. 479-500.*

Horn, Chris, et al., "Distributed Object Oriented Approaches", Proc. of the IFIP/IEEE International Conf. on Distributed Platforms: Client/Server and Beyond: DCE, CORBA, ODP and Advanced Distributed Applications, © 1996, pp. 7-17.*

Haas, Laura M., et al., "Optimizing Queries Across Diverse Data Sources", Proceedings of the 23rd VLDB Conference, Athens, Greece, © 1997, pp. 276-285.*

Stets, Robert J., et al., "Component-Based APIs for Versioning and Distributed Applications", IEEE Computer, vol. 32, Issue 7, Jul. 1999, pp. 54-61.*

Lissoir, Alan, "Part 1: Introduction to the Use of Exchange 2000 with Windows Script Host", Compaq ActiveAnswers: Technical Guide, Oct. 2000, pp. 1-75.*

Petrou, C., et al., An XML-based, 3-tier Scheme for Integrating Heterogeneous Information Sources to the WWW, DEXA 1999, Florence, Italy, Sep. 1-3, 1999, pp. 706-710.*

Bernstein, Philip A., et al., "Microsoft Repository Version 2 and the Open Information Model", Information Systems, vol. 24, Issue 2, Apr. 1999, pp. 71-98.*

* cited by examiner

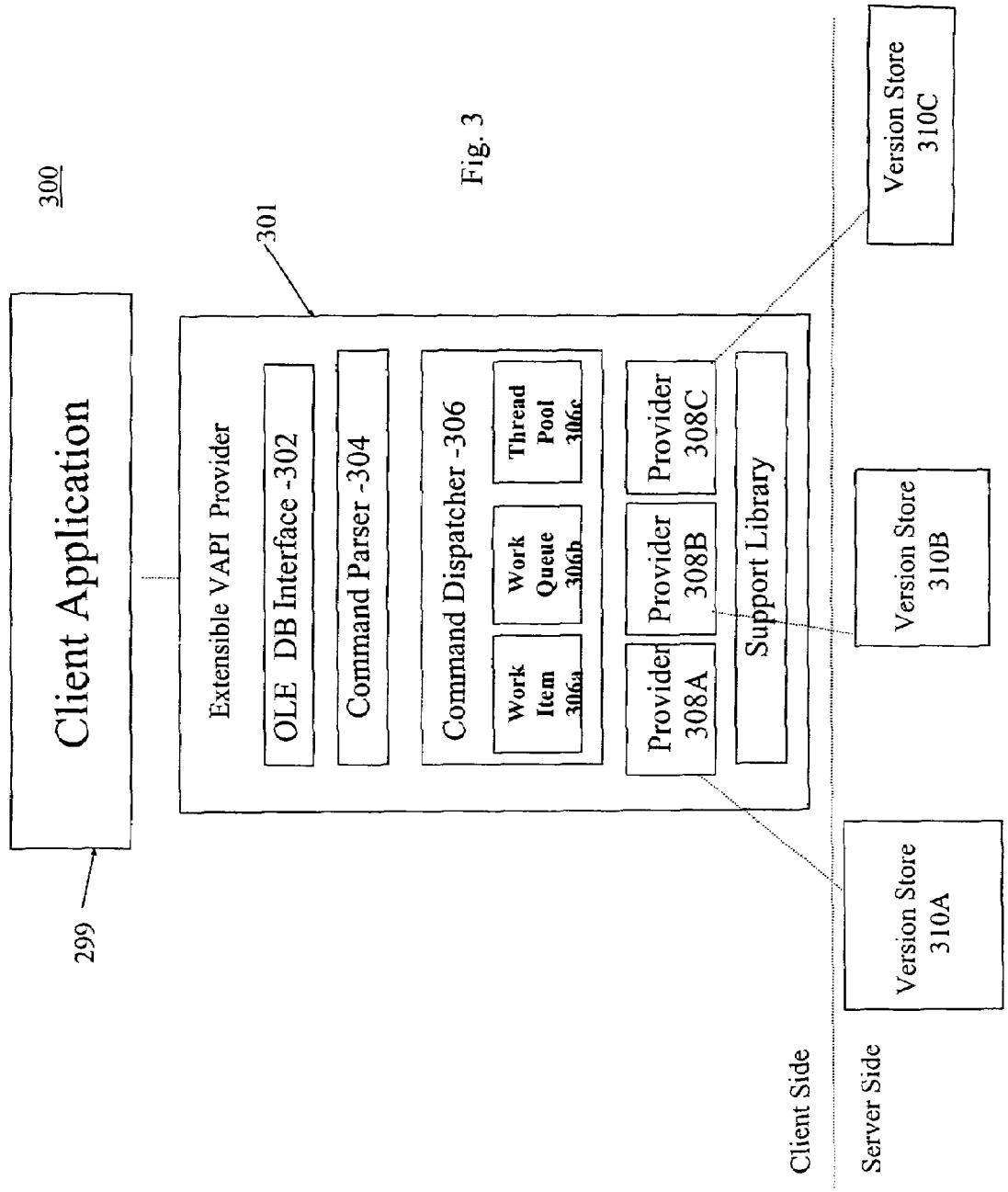

EXTENSIBLE ARCHITECTURE FOR VERSIONING APIS

CROSS-REFERENCE TO RELATED APPLICATIONS

This application is a continuation application and claims priority to U.S. patent application Ser. No. 09/717,533, filed Nov. 21, 2000, now U.S. Pat. No. 6,842,904, which is entitled "Extensible Architecture for Versioning APIs", and which is incorporated herein by reference in its entirety.

This application is related to co-owned U.S. patent application Ser. No. 09/717537, filed Nov. 21, 2000, now U.S. Pat. No. 6,915,507, which is entitled "Extensible Architecture for Project-Development Systems", and which is incorporated herein by reference in its entirety.

TECHNICAL FIELD

The present invention concerns methods and software for accessing databases that allow storage and tracking of multiple versions of files or documents as they evolve over time.

BACKGROUND

A database is a collection of electronic data, typically organized as files, or documents. Some databases, known as version or versioned stores, automatically store two or more versions of a document, with each version representing the state of a document at a particular time. To reduce storage requirements, most version stores keep an original version of a document and a sequence of change, or difference, files which track the changes made to the document over time. Thus, accessing a version other than the original requires reconstructing it through a process of merging one or more of the change files with the original.

A version store is usually a part of a larger versioning system, which additionally includes an application program interface (API) that facilitates communications between the version store and a client application (that is, an executing computer program, such as a word-processing program.) A user controlling the client application generally requests a specific version of a particular document and the API, which generally includes a command processor tailored for the version store, processes the request and forwards it to the version store for fulfillment. After reconstructing the requested version, the version store transfers all or a portion of it through the API to the client application for viewing, editing, or further processing at the direction of the user.

Although versioning systems are used in a wide variety of fields, one field where they are particularly important is software development. Developing application programs, operating systems, and other complex software generally entails large teams of programmers working on thousands or even tens of thousands of interdependent modules of computer instructions over many months. Over this time, the modules and their relationships to each other continually evolve, as programmers change not only their own modules, but also functional links between their modules and other modules. To manage these enormous development efforts, most, if not all, software makers use a software development system that includes a versioning system for storing and accessing multiple versions of the modules.

One problem that arises in this context is that some large software development projects need more than one versioning system to accommodate not only a diversity of document formats and data types, but also the geographic diversity of its programmers. However, conventional versioning systems are generally quite complex and expensive, generally making it cost prohibitive to have more than one or to combine two or more into a single system. A major factor in this complexity and expense is the API in each versioning system. Accordingly, there is a need for a more cost-efficient way of including two or more versioning systems in software development systems.

SUMMARY

To address the complexity and expense of designing and building versioning APIs (VAPIs), the inventors devised an exemplary VAPI architecture which can be extended with "plug-in" protocol providers to include virtually any number of separate version stores. The exemplary architecture includes a generic command parser and a command dispatcher. The command dispatcher operatively couples to one or more protocol providers, each of which is coupled to at least one version store.

Notably, in an exemplary embodiment, at least one of the protocol providers includes a specific command parser, allowing joint parsing of a command by the generic VAPI command parser and the specific command parser. Other notable functionality includes cross-provider command processing, such as copying data from one protocol provider to another.

DRAWINGS

FIG. 3 is a block diagram illustrating a versioning system 300 that incorporates the invention.

DETAILED DESCRIPTION

The following detailed description, which references and incorporates the drawings, describes and illustrates one or more exemplary embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

The description is organized into four sections. The first section describes an exemplary computer system implementation of the invention. The second section describes a conventional technology of OLE DB interfaces, which forms a portion of the exemplary embodiment of the invention. The third section describes an exemplary embodiment of a versioning application program interface (VAPI) in accord with the invention. And, the fourth section summarizes some features and advantages of the exemplary embodiment.

1. Exemplary Environment

Figure 1:
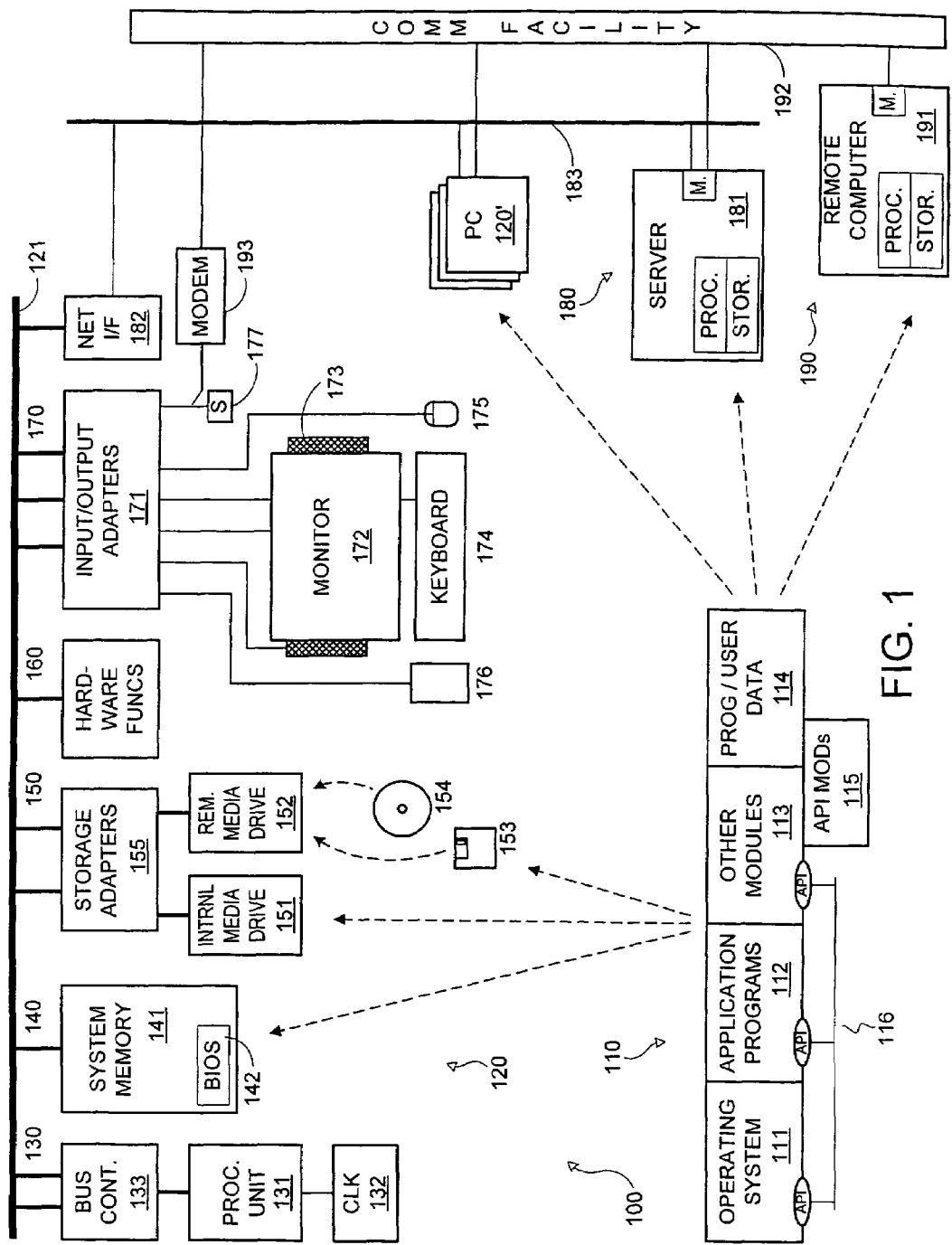
FIG. 1 is a block diagram of an exemplary environment for the invention.

FIG. 1 is a high-level diagram of an exemplary environment 100 having software 110 and hardware 120 for hosting the invention as executable instructions, data, and/or electronic and mechanical components. However, other suitable environments and variations of the described environment are also possible and within the scope of the invention.

Hardware components 120 are shown as a conventional personal computer (PC) including a number of components coupled together by one or more system buses 121 for carrying instructions, data, and control signals. These buses may assume a number of forms, such as the conventional ISA, PCI, and AGP buses. Some or all of the units coupled to a bus can act as a bus master for initiating transfers to other units. Processing unit 130 may have one or more microprocessors 131 driven by system clock 132 and coupled to one or more buses 121 by controllers 133. Internal memory system 140 supplies instructions and data to processing unit 130. High-speed RAM 141 stores any or all of the elements of software 110. ROM 142 commonly stores basic input/output system (BIOS) software for starting PC 120 and for controlling low-level operations among its components. Bulk storage subsystem 150 stores one or more elements of software 110. Hard disk drive 151 stores software 110 in a nonvolatile form. Drives 152 read and write software on removable media such as magnetic diskette 153 and optical disc 154. Other technologies for bulk storage are also known in the art. Adapters 155 couple the storage devices to system buses 121, and sometimes to each other directly. Other hardware units and adapters, indicated generally at 160, may perform specialized functions such as data encryption, signal processing, and the like, under the control of the processor or another unit on the buses.

Input/output (I/O) subsystem 170 has a number of specialized adapters 171 for connecting PC 120 to external devices for interfacing with a user. A monitor 172 creates a visual display of graphic data in any of several known forms. Speakers 173 output audio data that may arrive at an adapter 171 as digital wave samples, musical-instrument digital interface (MDI) streams, or other formats. Keyboard 174 accepts keystrokes from the user. A mouse or other pointing device 175 indicates where a user action is to occur. Block 176 represents other input and/or output devices, such as a small camera or microphone for converting video and audio input signals into digital data. Other input and output devices, such as printers and scanners commonly connect to standardized ports 177. These ports include parallel, serial, SCSI, USB, FireWire, and other conventional forms.

Personal computers frequently connect to other computers in networks. For example, local area network (LAN) 180 connect PC 120 to other PCs 120' and/or to remote servers 181 through a network adapter 182 in PC 120, using a standard protocol such as Ethernet or token-ring. Although FIG. 1 shows a physical cable 183 for interconnecting the LAN, wireless, optical, and other technologies are also available. Other networks, such as wide-area network (WAN) 190 can also interconnect PCs 120 and 120', and even servers 181, to remote computers 191. Computers 181 and 191 have processors, storage, and communications equipment similar to those of PC 120, although usually of higher capacity. FIG. 1 illustrates a communications facility 192 such as a public switched telephone network for a WAN 190 such as an intranet or the Internet. PC 120 can employ an internal or external modem 193 coupled to serial port 177. Other technologies such as packet-switching ISDN, ATM, DSL, frame-relay are also available. In a networked or distributed-computing environment, some of the software 110 may be stored on the other peer PCs 120', or on computers 181 and 191, each of which has its own storage devices and media.

Software elements 110 may be divided into a number of types whose designations overlap to some degree. For example, the previously mentioned BIOS sometimes includes high-level routines or programs which might also be classified as part of an operating system (OS) in other settings. The major purpose of OS 111 is to provide a software environment for executing application programs 112 and for managing the resources of system 100. An OS such as Windows® or Windows NT® from Microsoft Corp. commonly includes high-level application-program interfaces (APIs), file systems, communications protocols, input/output data conversions, and other functions.

Application programs 112 perform more direct functions for the user. A user normally calls them explicitly, although they can execute implicitly in connection with other applications or by association with particular data files or types. Modules 113 are packages of executable instructions and data, which may perform functions for OSs 111 or for applications 112. Dynamic link libraries (DLL) and class definitions, for instance, supply functions to one or more programs.

Data 114 includes user data of all types, data generated and/or stored by programs, and digital data that third parties make available on media or by download for use in computer 120. Software elements can be embodied as representations of program instructions and data in a number of physical media, such as memory 140, non-volatile storage 150, and signals on buses 183, 192, and so forth.

2. OLE DB Interface

Figure 2:
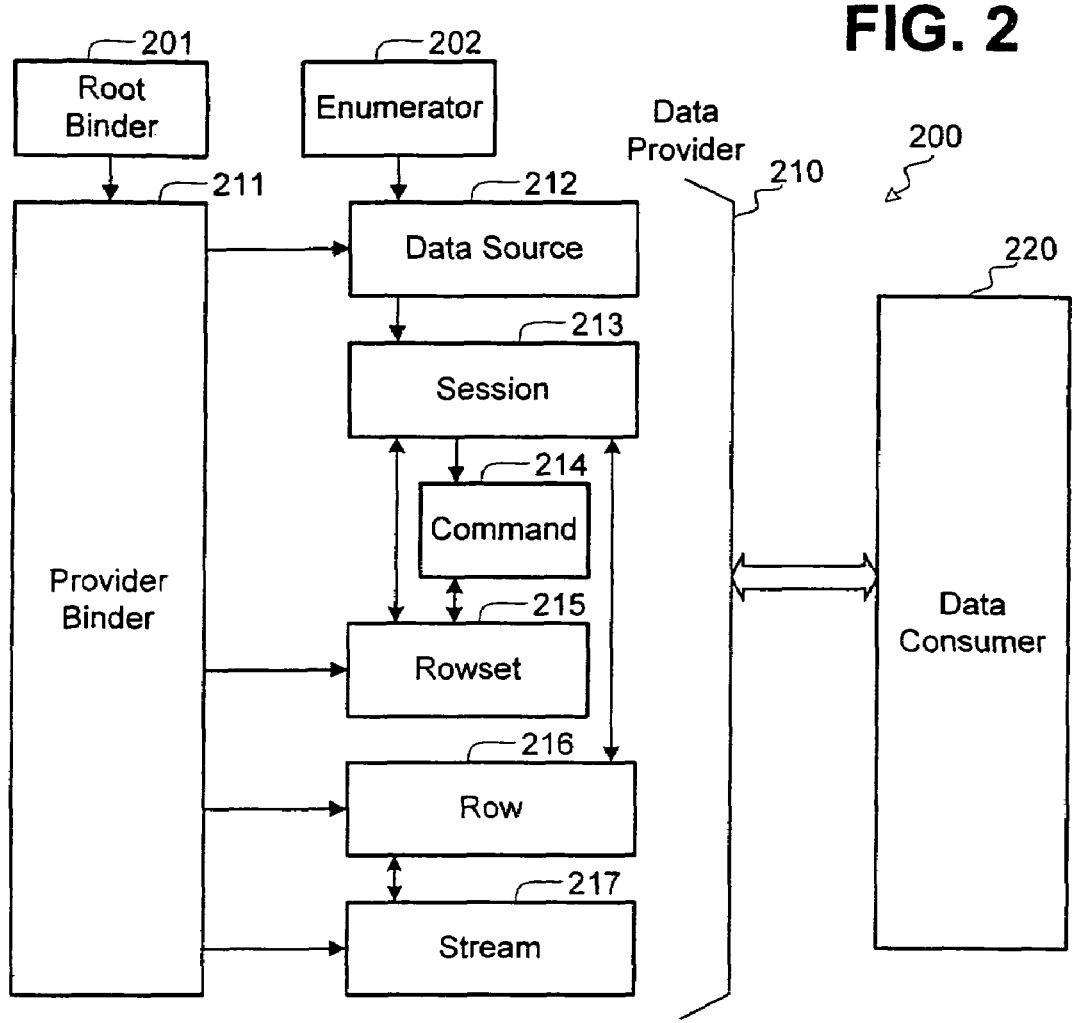
FIG. 2 is a block diagram illustrating an OLE DB interface portion of an exemplary embodiment of the invention.

FIG. 2 illustrates a conventional OLE DB 2.5 (Object Linking and Embedding Database) provider interface 200, a publicly available standard abstraction API from Microsoft Corp. for interacting with computer storage in the environment of the COM (Component Object Model) specification for writing computer objects, also publicly available from Microsoft Corp. OLE DB includes a set of interfaces for storing, finding, retrieving, and performing other conventional operations upon data and other objects located in a variety of storage devices in one or more computers. OLE DB interfaces can manage different types of data, including structured data such as relational databases, partly structured data such as file systems, and unstructured data such as documents.

The OLE DB API implements an overall interface as a collection of individual interfaces between a data provider 210 and a data consumer 220, both of which are software that manages certain types of data. A data provider directly exposes data to the consumer via the interfaces. (Other providers provide services such as query processing, and do not themselves expose data.) In general, a data store acting as a data provider need not necessarily support or expose all of the OLE DB interfaces, although it must of course support the native functions of the data types that it manages. A data consumer can choose any desired level of interoperability with specific data providers, and can sometimes even consume more than the provider itself supports, if a service provider having the missing functionality is available. A consumer can query a provider to determine its capabilities.

A binder is an OLE DB object that binds resources named in a URL (universal resource locator) to other OLE DB objects, such as a row, a rowset, a stream, a session, and so forth. Root binder 201 is an object that oversees the direct binding process. It maps bind requests to particular data providers such as 210. Provider binder 211 is an object that performs direct binding operations on the URL namespace for which it is registered. It creates particular objects based upon the URL specified in the bind request.

An OLE DB enumerator is an object that retrieves information concerning a provider that is available on the system. In the Windows® operating systems from Microsoft Corp., much of this information is contained in a registry, and can be accessed directly if desired. However, an enumerator abstracts the source of the information from an application, making it reachable regardless of where it is actually kept. Enumerator 202 obtains a particular data source object 212 named in a bind request to provider 210. A data source object connects to a data store such as a database, file, or document that a user wishes to access. Sessions 213 can then be created against the data source. A session is an individual connection that persists over a time until it is explicitly closed. Particular requests during a session can obtain commands 214, rowsets 215, and rows 216. A command 214 in a data-manipulation language issued during a session can obtain one or more rows, rowsets, or nothing at all. Rowsets can be used to navigate to a single row or to a data stream 217. A rowset, in OLE DB as in relational database parlance in general, is an object that contains one or more rows each having columns of data that satisfy a criterion in a query or other request. (A rowset can be empty.) A row is a set of related columns that describe a specific entity. A data stream is data that encapsulates arbitrary data, and may contain a document, a file, or other data in any format or in none. Rowsets can be used to navigate to a particular row and then to a stream containing, for example, a document.

3. Exemplary Versioning System

FIG. 3 shows a block diagram of an exemplary versioning system 300 in accord with the present invention. System 300 includes one or more client applications 299 coupled via extensible versioning application program interface (VAPI) 301 to version stores 310a, 310b, and 310c. Version stores 310a, 310b, and 310c include conventional versioning capabilities and store a number of documents or files, with each having a global unique identifier, such as a uniform resource locator, or URL. Each document also has an associated path and name.

In the exemplary embodiment, VAPI 301 includes an OLE DB interface 302, which is structurally identical to interface 200 in FIG. 2. (However, the invention is not so limited; indeed, other embodiments use alternative OLE DB and non-OLE-DB interface structures) Coupled operatively to OLE DB interface 302 are a command parser 304, a command dispatcher 306, and a number of protocol providers 308, of which providers 308a, 308b, and 308c are representative. Protocol providers 308a, 308b, and 308c are coupled to respective version stores 310a, 310b, and 310c. Exemplary protocol providers include enlistment managers, file systems, web folders, Microsoft Visual Studio servers, and Microsoft Visual SourceSafe version control systems. (Microsoft, Visual Studio, and Visual SourceSafe are trademarks of Microsoft Corporation of Redmond, Wash.)

In operation, OLE DB interface 302 receives a request or command from a client application for documents or other data from one or more of version stores 310a, 310b, or 310c. Commands are issued to a command object, such as object 214 in FIG. 2, in the context of a Session object, such as object 213. To improve performance, some embodiments avoid generating a thread for every session, relying instead on a shared pool of existing threads.

The request is forwarded to command parser 304. The command parser—a generic VAPI command parser in the exemplary embodiment—parses at least a portion of the request to identify at least one of the protocol providers 308a, 308b, or 308c. One embodiment uses a parser command language available from Microsoft under its VSIP partnership program. In the exemplary embodiment, each of the protocol providers includes a specific command parsing capability, enabling it to parse the unparsed portion of the request or command, and/or to assist command parser 304 in parsing the remainder of the request or command.

For example, when the request takes the form of a URL (comprising a scheme, a value, and an expression) command parser 304, parses the scheme which enables it to identify one of the protocol providers. The command parser then passes the remainder of the URL, that is, the value and the expression (if applicable) to the identified protocol provider (or protocol handler) for further parsing. Some embodiments allow complete parsing of the remainder of the URL and communicating the result, for example, in the form of a parse tree, to command parser 304.

Other embodiments do not allow URLs with arbitrary characters. In some embodiments, each protocol provider has or includes an associated URL (or scheme) parser. Also, to support the work item (or multiplexer) handling a copy between two providers, this associated parser can convert a URL that contains directory separators from one URL scheme to a URL that contains directory separators for another URL scheme. Thus, these associated (scheme-specific) parsers provide the capability of not only breaking a URL path string into a list of individual elements, but also building up a path string from such a list. In some embodiments, the generic command parser parses URLs based on standard delimiters but relies on scheme-specific parsers to validate, segment, and reconstitute the URL. The URLs using the standard delimiters are quoted, with the standard delimiters including blanks and commas. A command parser, in other embodiments, may also parse URLs for multiple protocol handlers. For example, a parser for file URLs may handle enlistment and non-enlistment URLs. A given command parser may also be able to handle multiple schemes, such as file URLs and HTTP (hypertext transfer protocol) URLs.

If the command or request includes complex expressions, command parser 304 parses such expressions and constructs expression trees using expression nodes to represent each item in the expression. In this case, parser 304 uses the source item to identify the protocol provider, as a node factory. That is, parser 304 calls the protocol provider for the VAPI command to obtain expression nodes for each item in the expression. This allows the provider to annotate this data as appropriate for later processing when it is called to perform the actual operation. Some embodiments separate the protocol handlers, parsers, and node factories into separate objects.

Once parsing is complete, the request is forwarded to command dispatcher 306 and the protocol handlers. The dispatcher and protocol handlers receive the request through standard C++ function calls. Although some embodiments pass a parse tree, the exemplary embodiment passes a composite object, which unifies the URL and modifiers such as revision, workspace, etc., through the architecture. Internally, the URL within the composite object is accessed via a scheme-independent interface. Command dispatcher 306, which in essence functions as a crossbar switch, is responsible for routing requests to the appropriate protocol provider. The parsed URL allows the dispatcher to programmatically determine which protocol provider receives the request, in the form of a parse tree. Each protocol provider is responsible for processing any request it receives. However, if a provider cannot fulfill the request, it would return an error to the dispatcher indicating so.

In the exemplary embodiment, dispatcher 306 includes a work item (or multiplexer) 306a, a work queue 306b, and a thread pool 306c. When the dispatcher receives a command, the dispatcher forms work item 306a and inserts it into work queue 306b. There is one work queue for each OLE DB session. (In some embodiments, the work queue follows a first-in-first-out protocol.) Thread pool 306c, which manages a collection of existing threads, accepts work items from work queues, such as queue 306b, and assigns each item to a thread which carries out the processing required by the item. The thread pool includes logic for dynamically deciding the number of threads to have running at a given time, balancing queue length against use of system resources.

Additionally, in the exemplary embodiment, the dispatcher performs rowset aggregation. In other words, the dispatcher receives search results from providers in the form of one or more rowsets and then aggregates the one or more rowsets inside a dispatcher rowset, which it forwards or otherwise makes accessible to the client application. The dispatcher rowset is wrapped around the one or more rowsets from the protocol providers. Thus, rowset aggregation is transparent to the client.

This rowset aggregation facilitates asynchronous calls in OLE DB, since when the client makes an asynchronous call or request, the dispatcher immediately returns an empty rowset to the client and then makes a synchronous call to the appropriate provider. The provider then does the actual work in the background and returns a non-empty rowset to the dispatcher, with the client learning when that work is done through conventional rowset mechanisms.

Other Notable Functionality

One notable capability of the exemplary VAPI architecture is cross-provider command processing. For example, issuing a command, such as "COPY FROM URL abc://m1/a/ DEPTH INFINITY TO URL xyz://m2/new" arbitrates a copy of all objects at abc://m1/a/ from the provider for "abc:" to xyz://m2/new/ from the provider for "xyz:" In this context, VAPI 301 essentially functions as a dynamic content and property switcher, routing information from one protocol provider to the other, with the dispatcher routing data from a source protocol provider to a destination protocol provider.

In the exemplary embodiment, the work item (or multiplexer) in the dispatcher determines whether a merge is necessary by querying the protocol handlers involved in the copy. If a merge is necessary, the work item hands off the relevant data to a merge engine (not shown), which performs the actual merge and passes the results to the client. Any unresolved conflicts are left for the user to resolve. However, in other embodiments, the destination protocol provider notifies the dispatcher of merge conflicts, and the dispatcher resolves these conflicts, eliminating the requirement that protocol handlers support merge resolution.

Additionally, protocol providers, in some embodiments, support two-phase commit and the OLE DB ITransactionJoin interface. In other embodiments, the providers support a custom transaction interface that is similar to OLE DB's transaction interfaces. From the client's perspective, the provider's session supports the OLE DB ITransactionLocal interface. Each protocol provider has a main VAPI session that receives transaction requests and one or more data session objects that manages transactions for the version stores to which the provider is connecting. The provider is responsible for establishing the data sessions and attaching them to the main VAPI session. The main VAPI session receives transaction requests from the client, and forwards them to attached data sessions.

The dispatcher manages asynchronous requests from the client by dispatching on a separate thread. Protocol providers need only support synchronous access. This simplifies protocol providers, since VAPI 301 carries the burden of implementing both synchronous and asynchronous options at the dispatcher.

4. Conclusion

In furtherance of the art, the present inventors have devised an extensible versioning API which facilitates cost-effective use of multiple version stores. The exemplary embodiment of the versioning API includes not only a OLE DB-compliant interface and command parser but also a command dispatcher for dispatching commands and requests to one of a number of versioning protocol providers. Inclusion of the OLE DB-compliant interface and the command parser in the versioning API saves the protocol providers the effort and expense of replicating these features. Thus, the exemplary embodiment of the invention ultimately reduces cost of adding version stores.

The embodiments described above are intended only to illustrate and teach one or more ways of practicing or implementing the present invention, not to restrict its breadth or scope. Only the following claims and their equivalents define the actual scope of the invention, which embraces all ways of practicing or implementing the concepts of the invention.

The invention claimed is:

1. A client-side computer system architecture for a versioning application program interface, the system comprising:
 a processor to execute computer instructions;
 a computer memory storing the computer instructions, which, when executed, establish system elements comprising:
 an OLE DB interface for communicating with a client application, said interface receiving a data request command from said client application;
 a first command parser operatively coupled to the OLE DB interface, said first command parser parsing said command to identify a protocol provider;
 a command dispatcher operatively coupled to the first command parser; and
 a first protocol provider and a second protocol provider respectively including a first versioning application program interface and a second versioning application program interface to receive at least one transaction request from the client application, and at least one first data session object and at least one second data session object, respectively, the at least one first data session object operatively coupled to the first versioning application program interface to receive at least one transaction request from the first versioning application program interface and the at least one second data session object operatively coupled to the second versioning application program interface to receive at least one transaction request from the second versioning application program interface, the first protocol provider and the second protocol provider operatively coupled to the command dispatcher, the first protocol provider and the second protocol provider including a second command parser and a third command parser respectively, the second command parser and the third command parser parsing at least a portion of said command, the first protocol provider and the second protocol provider communicatively coupled to a first version store and a second version store respectively, the first version store and the second version store located in at least one server;
 wherein the command dispatcher receives search results in response to the data request command, the search results provided by the first and second protocol providers in the form of one or more rowsets, the command dispatcher aggregating the one or more rowsets received from the first protocol provider and the second protocol provider into a dispatcher rowset, the dispatcher rowset forwarded to the client application; and a computer monitor which displays the dispatcher rowset via the client application.

2. The system of claim 1, wherein the OLE DB interface is compatible with the OLE DB 2.5 specification.

3. The system of claim 1, wherein the command dispatcher functions in one mode of a group of modes consisting of synchronous and asynchronous, and wherein one or more of the first and second protocol providers function synchronously.

4. The system of claim 1, wherein the first and second protocol providers are implemented as one or more of a group consisting of C++ and COM objects.

5. A method of operating a client side computer system with two or more server-side version stores, the method comprising:

receiving a data request from a client application on the client-side computer, the data request having at least first and second portions;

parsing the first portion of the request, parsing the first portion resulting in a first identified protocol provider;

parsing the second portion of the request based on results of parsing the first portion, the parsing the second portion resulting in a second identified protocol provider;

dispatching the parsed first portion and the parsed second portion of the request from the first protocol provider and the second protocol provider respectively to a first version store and a second version store respectively, wherein the first protocol provider and the second protocol provider each have internal command parsers, an internal versioning application program interface, and at least one data session object operatively coupled to the internal versioning application program interface to receive at least one transaction request from the internal versioning application program interface for managing the at least one transaction request for the first version store and the second version store, respectively, and wherein the first version store and the second version store are located in at least one server;

wherein search results are received in response to the data request, the search results received from the first version store and the second version store in the form of rowsets which are aggregated into a dispatcher rowset and forwarded to the client application; and displaying the rowsets on a client-side computer monitor.

6. The method of claim 5, wherein parsing the second portion of the request based on results of parsing the first portion comprises:

passing the second portion to a command parser associated with a version associated with the first identified protocol provider; and parsing the second portion at the command parser associated with the version associated with the second identified protocol provider.

7. The method of claim 5, wherein receiving the request from the client application occurs asynchronously and wherein dispatching the first and second portions of the request occurs synchronously.

8. A computer-readable storage medium storing computer-executable instructions that, when executed by a computer, cause the computer to perform a method of operating a client side computer system with two or more server-side version stores, the method comprising:

receiving a data request from a client application on the client-side computer, the data request having at least first and second portions;

parsing the first portion of the request, parsing the first portion resulting in a first identified protocol provider;

parsing the second portion of the request based on results of parsing the first portion, the parsing the second portion resulting in a second identified protocol provider;

dispatching the parsed first portion and the parsed second portion of the request from the first protocol provider and the second protocol provider respectively to a first version store and a second version store respectively, wherein the first protocol provider and the second protocol provider each have internal command parsers, an internal versioning application program interface, and at least one data session object operatively coupled to the internal versioning application program interface to receive at least one transaction request from the internal versioning application program interface for managing the at least one transaction request for the first version store and the second version store, respectively, and wherein the first version store and the second version store are located in at least one server;

wherein search results are received in response to the data request, the search results received from the first version store and the second version store in the form of rowsets which are aggregated into a dispatcher rowset and forwarded to the client application; and displaying the rowsets on a client-side computer monitor.

9. The computer-readable storage medium of claim 8, storing further computer-executable instructions that, when executed, cause the computer to parse the second portion of the request based on results of parsing the first portion by:

passing the second portion to a command parser associated with a version associated with the first identified protocol provider; and parsing the second portion at the command parser associated with the version associated with the second identified protocol provider.

10. The computer-readable storage medium of claim 8, storing further computer-executable instructions that, when executed, cause the computer to receive the request from the client application asynchronously and dispatch the first and second portions of the request synchronously.

* * * * *

UNITED STATES PATENT AND TRADEMARK OFFICE
CERTIFICATE OF CORRECTION

| | |
|---|---|
| PATENT NO. | : 7,610,316 B2 |
| APPLICATION NO. | : 10/935350 |
| DATED | : October 27, 2009 |
| INVENTOR(S) | : Bradley J. Bartz et al. |

It is certified that error appears in the above-identified patent and that said Letters Patent is hereby corrected as shown below:

Title Pg, Item (57), under "Abstract" column 2, line 9, delete ""plug-in"protocol" and insert -- "plug-in" protocol --, therefor.

In column 5, line 53, delete "3l0c" and insert -- 310c --, therefor.

Signed and Sealed this
Eighth Day of February, 2011

David J. Kappos
*Director of the United States Patent and Trademark Office*